US011196484B2

(12) United States Patent
Barrier, IV

(10) Patent No.: US 11,196,484 B2
(45) Date of Patent: Dec. 7, 2021

(54) FINDING THE EYE CENTER WITH A LOW-POWER EYE MONITOR USING A 3-DIMENSIONAL ALGORITHM

(71) Applicant: MACOM Technology Solutions Holdings, Inc., Lowell, MA (US)

(72) Inventor: George L. Barrier, IV, Lowell, MA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 0 days.

(21) Appl. No.: 17/071,801

(22) Filed: Oct. 15, 2020

(65) Prior Publication Data

US 2021/0111793 A1  Apr. 15, 2021

Related U.S. Application Data

(60) Provisional application No. 63/047,818, filed on Jul. 2, 2020, provisional application No. 62/915,583, filed on Oct. 15, 2019.

(51) Int. Cl.
*H04B 10/69* (2013.01)
*H04B 10/079* (2013.01)

(52) U.S. Cl.
CPC ....... *H04B 10/0795* (2013.01); *H04B 10/695* (2013.01)

(58) Field of Classification Search
CPC ................................................. H04B 10/695
See application file for complete search history.

(56) References Cited

U.S. PATENT DOCUMENTS 5,019,769 A  5/1991 Levinson
5,383,208 A  1/1995 Queniat et al.
(Continued)

FOREIGN PATENT DOCUMENTS

EP        3500867       6/2019
KR   1020050085785     8/2005
(Continued)

OTHER PUBLICATIONS

Tektronix, Analyzing 26-53 GBaud PAM4 Optical and Electrical Signals, Jun. 2018 (Year: 2018).*
(Continued)

*Primary Examiner* — Shi K Li
(74) *Attorney, Agent, or Firm* — Weide & Miller, Ltd.

(57) ABSTRACT

An improved method and system for locating a slicer threshold and phase is disclosed. A two-dimensional field of coordinates is defined using phase versus eye monitor magnitude. At each coordinate, the number of samples above the eye monitor magnitude are counted. Dividing by the total number of samples considered yields a ratio between 0 and 1. Each eye 0, 1, 2 (bottom, middle, top in a PAM4 system) has an ideal ratio (75%, 50%, 25%) assuming a balanced distribution of PAM4 levels. The rating (third dimension) at each coordinate is calculated to be (0.25−abs.value (actual_ratio−ideal_ratio)) limited to positive results only. The resulting ratings are summed over phase. The eye center is calculated using weighted average of the sums. The eye center is compared to the calibrated target to determine which way to move the slicer threshold.

19 Claims, 9 Drawing Sheets

(56) References Cited

U.S. PATENT DOCUMENTS

| | | |
|---|---|---|
| 5,396,059 A | 3/1995 | Yeates |
| 5,594,748 A | 1/1997 | Jabr |
| 5,812,572 A | 9/1998 | King et al. |
| 6,438,450 B1 | 8/2002 | DiLorenzo |
| 6,494,370 B1 | 12/2002 | Sanchez |
| 6,556,601 B2 | 4/2003 | Nagata |
| 6,707,492 B1 | 3/2004 | Itani |
| 6,934,479 B2 | 8/2005 | Sakamoto et al. |
| 6,952,531 B2 | 10/2005 | Aronson et al. |
| 7,227,916 B2 | 6/2007 | Ruelke et al. |
| 7,236,108 B2 | 6/2007 | Cheng |
| 7,265,334 B2 | 9/2007 | Draper et al. |
| 7,276,682 B2 | 10/2007 | Draper et al. |
| 7,381,935 B2 | 6/2008 | Sada et al. |
| 7,456,690 B2 | 11/2008 | Kocaman |
| 7,505,498 B2 | 3/2009 | Sanchez |
| 7,701,833 B2 | 4/2010 | Kim |
| 7,734,309 B2 | 6/2010 | Chi et al. |
| 7,949,025 B2 | 5/2011 | Olea |
| 8,213,494 B2 | 7/2012 | Hidaka |
| 8,861,578 B1 | 10/2014 | Lusted et al. |
| 8,995,514 B1 | 3/2015 | Asuncion et al. |
| 9,231,803 B2 | 1/2016 | Nishi |
| 9,397,868 B1 | 7/2016 | Hossain et al. |
| 9,559,880 B1 | 1/2017 | Cirit et al. |
| 9,853,735 B1 | 12/2017 | Lin |
| 9,853,839 B2 | 12/2017 | Beukema et al. |
| 9,882,703 B1 | 1/2018 | Xu |
| 9,906,232 B1 | 2/2018 | Cho |
| 10,333,692 B2 | 6/2019 | Miura |
| 2003/0165168 A1 | 9/2003 | Murata |
| 2004/0188717 A1 | 9/2004 | Ono |
| 2005/0226355 A1 | 10/2005 | Kibune et al. |
| 2006/0098699 A1 | 5/2006 | Sanchez |
| 2006/0126683 A1 | 6/2006 | Kang |
| 2006/0153256 A1 | 7/2006 | Sanchez |
| 2006/0165139 A1 | 7/2006 | Sanchez |
| 2007/0160173 A1 | 7/2007 | Takeuchi |
| 2015/0180642 A1 | 6/2015 | Hsieh et al. |
| 2015/0381393 A1 | 12/2015 | Kotagiri |
| 2016/0006589 A1 | 1/2016 | Kamali |
| 2016/0352557 A1 | 12/2016 | Liao |
| 2017/0070370 A1 | 3/2017 | He et al. |
| 2017/0288369 A1 | 10/2017 | Ikram et al. |
| 2018/0159514 A1* | 6/2018 | Zerbe .................. G11C 7/02 |
| 2020/0145261 A1* | 5/2020 | Navid ................ H04L 25/028 |
| 2020/0195475 A1 | 6/2020 | Lin |

FOREIGN PATENT DOCUMENTS

| | | |
|---|---|---|
| KR | 1020100061753 | 6/2010 |
| KR | 101684801 | 12/2016 |
| KR | 102017014818 | 12/2018 |
| KR | 1020180049784 | 5/2019 |
| WO | WO 2008/070138 | 6/2008 |
| WO | WO 2018/080652 | 5/2018 |

OTHER PUBLICATIONS

International Search Report issued for Application No. PCT/US2020/055839 dated Jan. 29, 2021.

U.S. Appl. No. 10/404,496, filed Sep. 2019, Azenkot.

French National Institute of Industrial Property ("INPI") Preliminary Report issued for Application No. FR191046 dated Jun. 19, 2020.

International Search Report issued for Application No. PCT/US2020/050919 dated Dec. 23, 2020.

International Search Report issued for Application No. PCT/US2020/051657 dated Jan. 13, 2021.

* cited by examiner

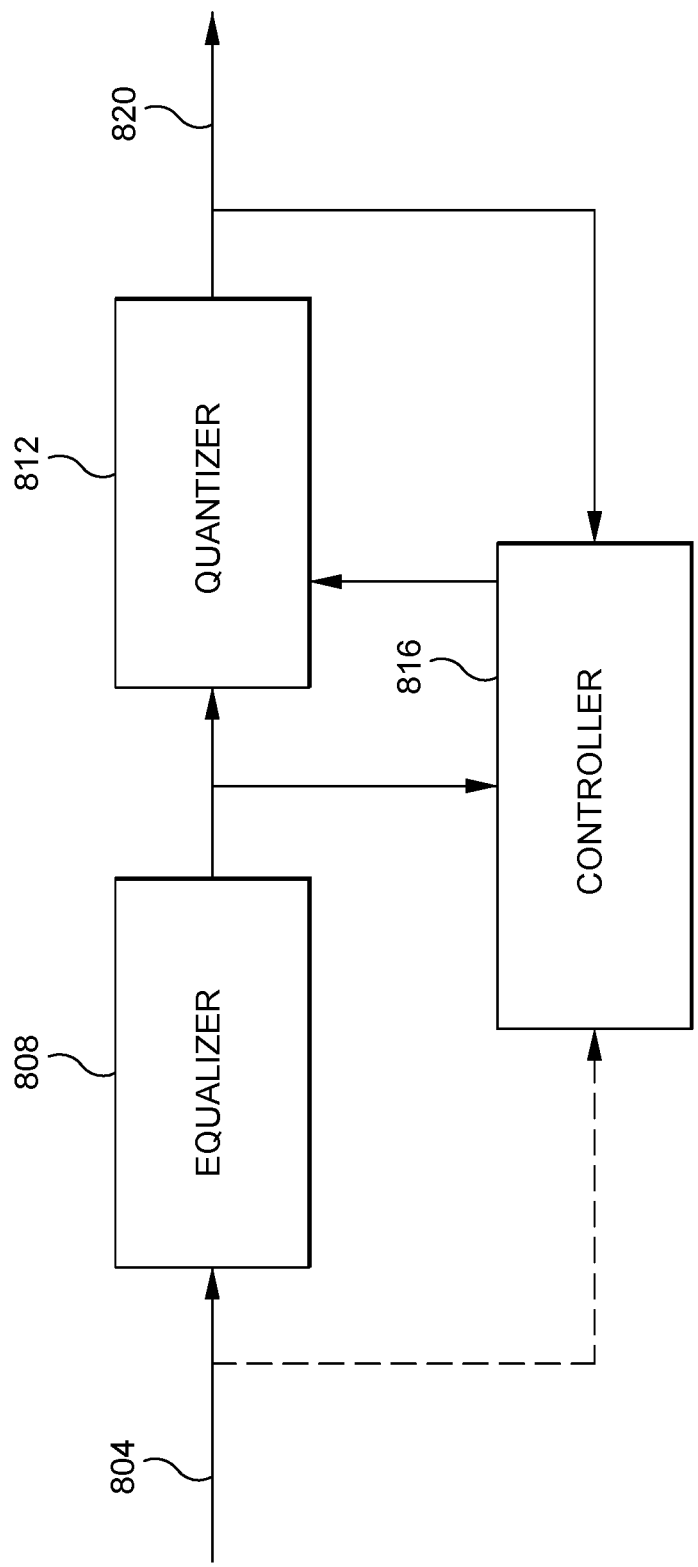

FINDING THE EYE CENTER WITH A LOW-POWER EYE MONITOR USING A 3-DIMENSIONAL ALGORITHM

1. FIELD OF THE INVENTION

This invention relates to eye diagram analysis and in particular to a method and system for calculating a slicing threshold based on an eye opening.

2. RELATED ART

Locating the eye center is critical to making a good adaptation decision. Distortions in the eye diagram resulting from a received signal can make this decision even more difficult. Prior art devices look for the phase with the widest eye opening, then find the center between the lids at only that phase. In the prior art, this method includes considering the range of voltages which define the received signal, then deciding the sampling point (phase) and what threshold value to use. Then, the slicer is programmed to slice at this phase and threshold. The prior art method suffered from several disadvantages and, as a result, calculated a less than optimal slice point.

SUMMARY

To overcome the drawbacks of the prior art, a method for locating an eye center in a signal plot, based on received samples in a communication system, is disclosed. In one embodiment, this method comprises determining a location of a selected eye of an eye diagram plot and for the selected eye, and for a different voltage levels, count a number of samples which are above or below the voltage level to determine a sample counts at different voltage levels. This method of operation then processes sample counts to determine middle of eye. For two or more different voltage levels and at difference phases, calculate an actual ratio of samples above a particular voltage level in relation to total number of samples. Then, the actual ratios are associated with each sample at which the ratio was calculated and, for one or more samples, subtract an ideal ratio from actual ratio to calculate ratio error. For one or more samples, calculate absolute value of ratio error and, for one or more absolute value of ratio error, then round down absolute value of the ratio error values that are over a predetermined value to create ratings. Then, analyze ratings to locate eye center voltage such that rounded ratings at or near the predetermined values are defined as being in the eye. For ratings which are in the eye, define the rating in the center of the group of ratings which are in the eye, and define the rating in the center as the optimal voltage and phase for an eye.

In one embodiment, the ideal ratio is a ratio based on the number of expected sample value above a voltage level in relation to the total number of samples. It is contemplated the predetermined value is 1/N, where N is the number of PAM-N levels. It is contemplated that this method may be repeated for each eye. A sample can be defined by a voltage magnitude at a phase. This method may further comprise adjusting a quantizer threshold based on the optimal voltage and phase for an eye. It is also disclosed that the step of locating the center may further comprise summing the ratings for multiple voltage levels to obtain a sum of all ratings for each voltage to create rating sums, and for the rating sums, perform a weighted average calculation to reduces rating sums to a single point such that the single point is the optimal threshold voltage.

Also disclosed herein is a system for determining an optimal threshold value for use in a quantizer that is part of a communication system. In one configuration, this system is part of a receiver, that is part of the communication system. The receiver comprising a quantizer configured to process a received signal to assign the value to the signal at a slice point by comparing the signal to one or more threshold values. A controller configured to process a received signal to determine optimal threshold values or calculate an offset to existing threshold values. The processing performed by the controller for an eye of an eye diagram plot of the signal value. The processing includes, for two or more different voltage levels and at difference phases, calculating an actual ratio defined as a number of samples above a voltage level in relation to the total number of samples. Then, associate the actual ratios with each sample at which actual ratio was calculated. For one or more samples, subtract an ideal ratio from the actual ratio to calculate a ratio error and then calculate absolute value of ratio error. The processing then rounds down the absolute value of the ratio error values that are over a predetermined value to create ratings having a value, and then analyze the ratings to identify a rating in the center of the ratings over a predetermined value and designate that rating as the optimal voltage and phase for an eye.

In one embodiment, the controller comprises a finite state machine configured to execute machine executable instructions. The ideal ratio is a ratio which may be based on the number of expected sample value above a voltage level in relation to the total number of samples. In one embodiment, the predetermined value is 1/N, where N is the number of PAM-N levels. In one configuration, a sample is defined by a voltage magnitude at a phase. In one configuration, the rating in the center is computed by summing the ratings for multiple voltage levels to obtain a sum of all rating for each voltage to create rating sums, and for the rating sums, perform a weighted average calculation to reduces rating sums to a single point such that the single point is the optimal threshold voltage.

Also disclosed is a method for locating eye center in a signal plot, based on numerous received samples in a communication system receiver, for optimizing quantizer threshold levels. In one embodiment, this method comprises for two or more different voltage levels within an eye, count a number of samples which are above or below the two or more voltage levels to determine a sample counts at the two or more different voltage levels. Then, for two or more different voltage levels, which are within the eye, and at difference phases, which are within the eye, calculate an actual ratio of samples above or below the two or more different voltage levels in relation to total number of samples. This method also associates the actual ratios with the sample at which the actual ratio was calculated. For one or more samples, subtract an ideal ratio from actual ratio to calculate ratio error and for one or more samples, calculate absolute value of ratio error. Then, for one or more absolute value of ratio error, round down absolute value of the ratio error values that are over a predetermined value to create ratings. Then, analyze the ratings to locate eye center voltages such that rounded data at or near the predetermined value are in the eye and for ratings which are non-zero, define the rating which is at the center of the non-zero ratings as being the optimal voltage and phase for the eye.

In one embodiment, the ideal ratio is a ratio based on the number of expected sample value above a voltage level in relation to the total number of samples. The rating may be a single value for each sample. In one embodiment, this method may further comprise adjusting a quantizer threshold based on the optimal voltage and phase for the eye. The predetermined value may e 1/N, where N is the number of PAM-N levels. In one configuration the center rating is located by summing the ratings for multiple voltage levels to obtain a sum of all rating for the multiple voltages to create rating sums, and performing a weighted average calculation on the rating sums to reduce rating sums to a single point such that the single point is the optimal threshold voltage.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 8 is a block diagram of an exemplary receiver with equalizer.

DETAILED DESCRIPTION

Figure 1:
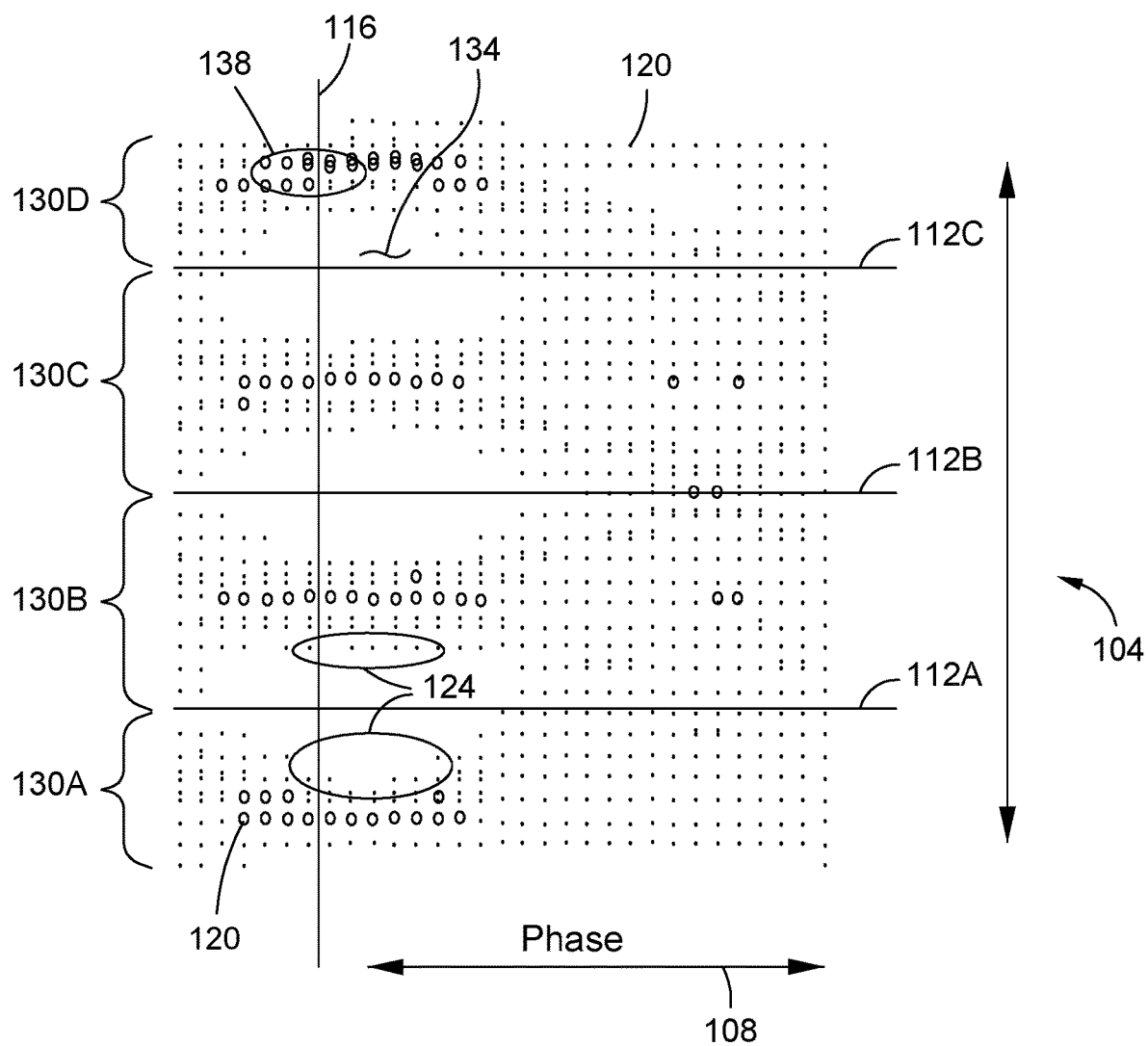
FIG. 1 is an example sample plot showing an eye diagram.

FIG. 1 provides an exemplary eye diagram plot. The vertical axis 104 represents voltage while the horizontal axis 108 represents phase. To overcome the drawbacks of the prior art and provide additional benefits, an improved method and system for locating a slicer threshold 112A, 112B, 112C and particular phase 116 is disclosed. In general, a two-dimensional field of coordinates or samples 120 is defined using phase versus eye monitor magnitude. At each coordinate, the number of samples above the eye monitor magnitude (threshold) are counted. Dividing by the total number of samples considered yields a ratio between 0 and 1. Each eye 0, 1, 2 (bottom, middle, top in a PAM4 system) has an ideal ratio (75%, 50%, 25%) assuming a balanced distribution of PAM4 levels. The rating (third dimension) at each coordinate is calculated to be (0.25-abs.value (actual_ratio-ideal_ratio)) limited to positive results only. The resulting ratings are summed over phase. The eye center is calculated using weighted average of the sums. The eye center is compared to the calibrated target to determine which way to move the slicer threshold.

This new method and system is developed in response to a measured weakness of the current algorithm when large input signals are provided. In reference to FIG. 1, an exemplary eye diagram is shown formed by a large number of samples 120 which form eyes 134. At a particular phase 116, the samples 138 are grouped away from the eyes 134 and away from the thresholds 112.

In the prior art, finding the eye lids 124 when one or both lids are flattened at the edge of the ADC range is problematic. Furthermore, the more ideal the slicer is designed, the less information there is on which to adapt the slicer thresholds 112A, 112B, 112C. When the eye lid 124 is flat, information from closer to the eye crossing is needed to help make a decision. This new method and system pulls in information even from beyond the eye lid, avoiding most ADC range distortion. Additionally, it also pulls in information from all phases, avoiding the ambiguity near the eye center.

As discussed above, it is important to accurately define a threshold 112. The threshold 112A, 112B, 112C is a value that delineates whether to slice a signal to a band above the threshold or below the threshold during processing. For example in a PAM4 system, when an incoming signal is received, a determination must be made whether that signal, at the sampling point 120, is intended to be a band1 value 130A, a band2 value 130B, a band3 value 130C, or a band4 value 130D.

In a system with two logic levels, the received signal is sliced to either a logic 1 level or a logic 0 level. Between the logic 1 level and the logic 0 level is a threshold. When sampled 120, received signals greater than the threshold are sliced to logic 1 level while signals which are lower than the threshold, when sampled, are sliced to a logic 0 level. In a PAM4 system as reflected in FIG. 1, the received signal is sliced to one of four different values (bands) 130A, 130B, 130C, 130D, hence there are three thresholds 112A, 112B, 112C, one between each pair of bands.

The determination of an accurate threshold 112A, 112B, 112C (collectively 112) is important because it greatly affects the bit error rate. During operation, it is important to adjust a slicer threshold 112 to make as accurate decision as possible. It may be desirable to have the threshold 112 to be right in the middle of the eye, but in some cases, that may not be ideal.

To overcome the draw backs of the prior art, a one step process is proposed such that information from the phase (which defines the sampling point) and the voltage of the received samples is processed to generate optimal threshold values (phase and voltage) between each band.

This one step process may be considered a two-stage process. During a first stage of operation, calibration occurs to determine a location of an eye. Then during later stages, a location of the threshold level (phase and voltage) within the eye is determined. This may be considered a multidimensional approach or a two-dimensional approach which then expands to a three-dimensional approach.

Figure 2A:
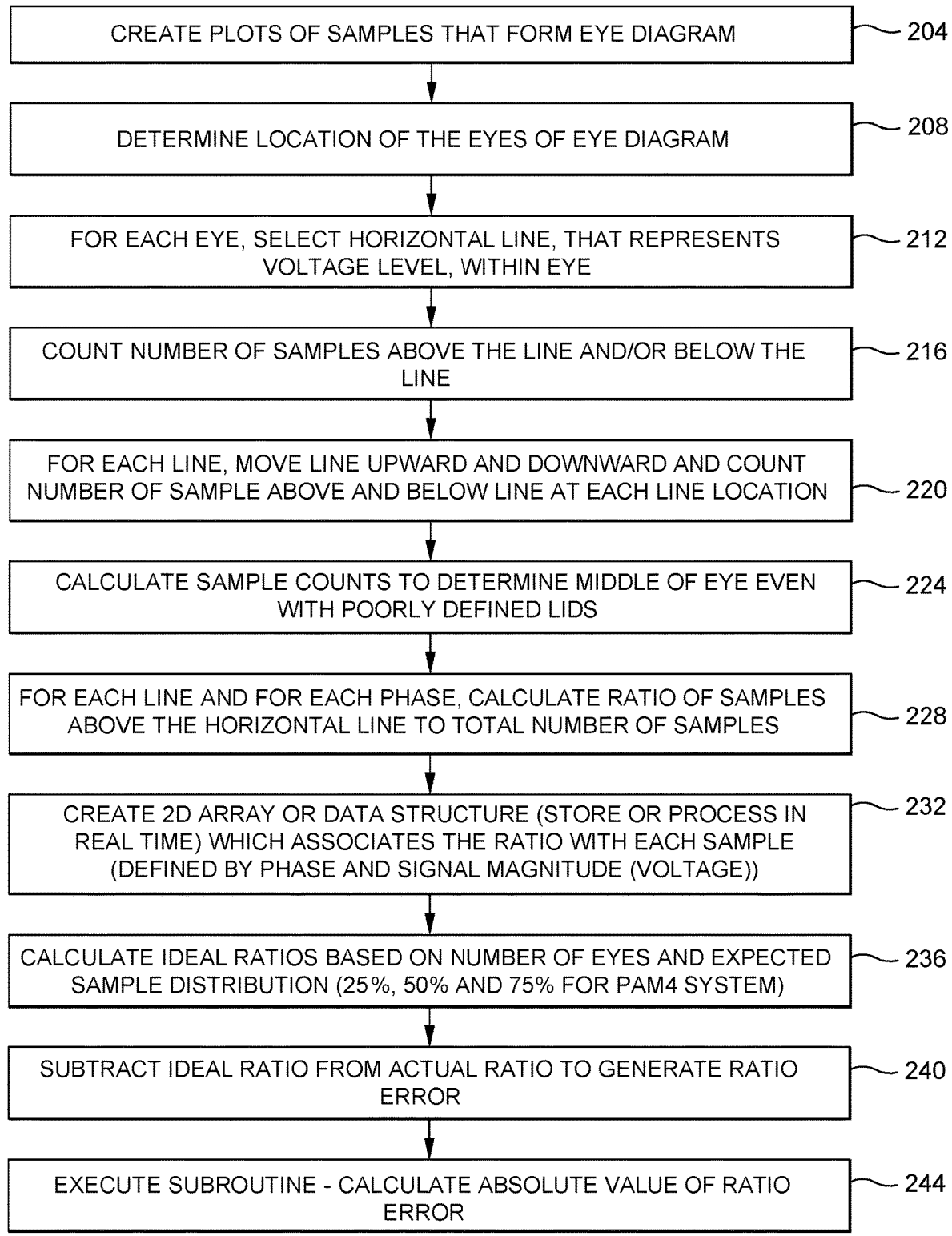
FIG. 2A and FIG. 2B illustrate a flow diagram of an exemplary method of operation for threshold level calculation.
Figure 2B:
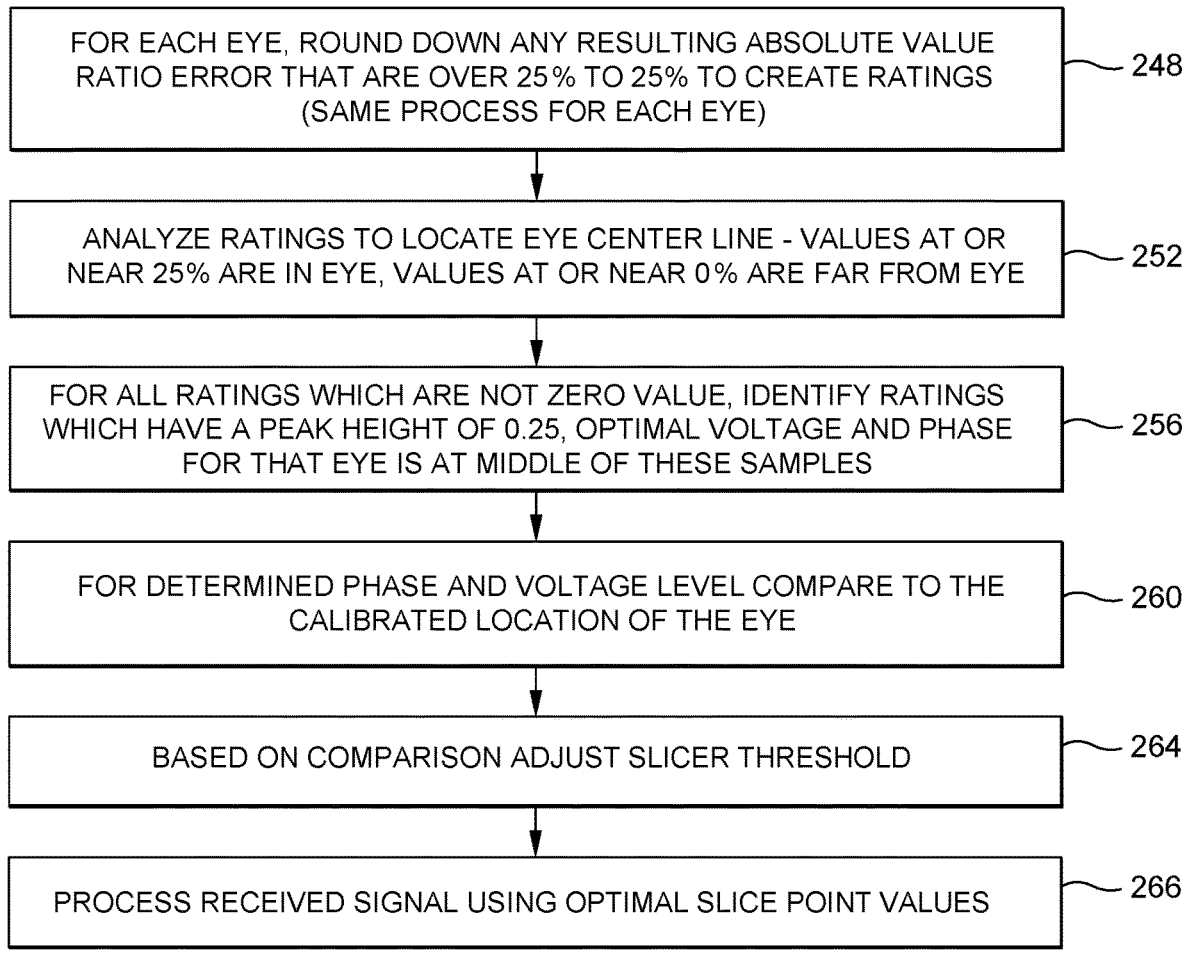

In reference to FIG. 2, using an eye monitor, the location of the eye can be located. At a step 204, using the eye monitor, samples can be massed thus revealing, either visually, statistically, or numerically, the eye and its location. At a step 208, the eyes of the signal plots are identified. At a step 212, working with an eye diagram, an initial step is to select a horizontal line (value) within an eye and then, at a step 216, this method of operation counts the number of samples above that line. As will be understood, the method disclosed herein may also be configured to count the number of samples below the line, as long as associated processing is also adjusted to account for this change. Those of ordinary skill in the art can select sample counting above or below the selected voltage level based on the disclosure of this example method of operation. Any location (voltage value level) may be selected. In one embodiment, the voltage value (horizontal line) must be within the eye. For example, if 100 samples are counted, and if 25 samples are above the line (meaning that 75 samples are below the line), then that line is in the top or upper section of the eye.

In a typical PAM4 system, the transmitted signal is processed to have approximately the same number of 0, 1, 2, and 3 values. Thus, when received and sampled, the number of 0, 1, 2, and 3 values will also be approximately equal over time.

Inside the top eye there may be no sample points. Thus, it is difficult to determine where the line is in the top eye. To obtain more information the line is moved (voltage value defined by the line) upward, at a step 220, to obtain additional samples above and below the line, and then move the line downward, to obtain additional samples above and below the line to know where the line (value) is in relation to the samples. At a step 224, for each selected line location (voltage value), calculate sample counts such as samples above and/or below a line.

Thus, the goal is to find the middle of the eye without moving the eye, or how to deal with situations in which the lids of the eye are mangled. The lid of the eye is the area (samples) at the top of the eye and the bottom of the eye. Instead of choosing a phase (sampling point) and then adapting thresholds to that phase in an effort to select the best threshold, it is instead proposed to scan a selected set of horizontal lines doing a two-dimensional scan of a particular eye of the eye diagram. The steps described above, namely steps 208 through 224 may only occur once during the calibration process. The remaining steps describe below occur repeatedly during operation.

At a step 228, at each coordinate (sample) of the scan (for a voltage and phase), this method calculates the ratio of samples above the horizontal line to total number of samples. As is understood, the eye diagram is a two dimensional plot with the vertical axis representing signal magnitude (voltage) and the horizontal axis representing phase (sampling point). At a step 232, a two dimensional array or data structure is created, and optionally stored or processed in real time, which associates the ratio for each sample (defined by phase and signal magnitude (voltage)). Using this new method of processing, the analysis is not based only on samples at the lids.

Thus, as discussed above, the process starts off with two-dimensional image (the eye diagram) and performs a two-dimensional scan at each coordinate. This method calculates, for each level (voltage) at each phase, the ratio (third dimension) (number of samples that are above that level in relation to number of samples points at that coordinate, as phase is varied across a cycle (0 to 360 degrees)). This may be considered the first loop.

Stated another way, the process may divide the vertical axis into steps (defining the location of the horizontal lines) and at each step, which represents a voltage, a line may be superimposed on the eye diagram. Across the horizontal line (at the fixed voltage level for one iteration of this loop), the phase is incremented to span one cycle (360 degrees). A ratio of the sample count above the horizontal line and total number of samples is calculated for each coordinate. Thus, at each voltage level, this process scans or varies the phase in any direction, in any order, or random order. It is not important if the voltage is varied (scanned) top to bottom or bottom to top. Likewise, the direction in which the phase is varied or scanned is not important. This process can also start the scan at any start point if the scan completes a full cycle.

It is expected that this process will yield a different result at each phase due to the eye diagram being oval and not rectangular. Of importance is, how the system calculates the ratio at a particular voltage and a particular phase, that is a coordinate of the 2D space. At each coordinate, the system calculates the ratio of the number of samples above the sample point and below the sample point. From this, the fraction of samples above the sample point is determined. In one embodiment, the phase is divided into 32 discrete settings or points, and it is swept across those 32 settings. Any other number of phase settings may be possible.

Using this process at each coordinate, the ratio will be a fractional value between 0 and 1. If the selected voltage is a low voltage near the bottom of the eye diagram, then most all points will be above yielding a fractional value that is close to 1.0. If the selected voltage is a high voltage near the upper area of the eye diagram, then most all the points will be below that line and the ratio will be a fractional value close to 0.0.

Next, this method considers that the eye diagram has three eyes, referred to from bottom to top as eye0, eye1, eye2. At step 236, the method calculates ideal ratios for the system. Because there is a generally equal distribution of signal values at each of the four bands (PAM4 system), each threshold level has an ideal fractional ratio of 25%, 50% and 75%. For example, the threshold for the bottom eye (eye0) has an ideal ratio of 75%, because ideally 25% of the samples will be below the bottom eye threshold and 75% of the samples will be above the bottom eye threshold. This same principle applies to the other eyes.

Next, at a step 240 this process takes the actual ratio for a coordinate (voltage, phase) that was measured and stored, and then subtracts the ideal ratio, which yields the ratio error. Thus, the ratio error is how far off the actual ratio is to the ideal ratio.

Next, another processing routine occurs inside the above described processing routine. Returning to the ratio error, which is the measured ratio versus ideal ratio. At a step 244, the processing routine calculates the absolute value of ratio error (which yields the ratio error with only positive values). At a step 248, the resulting absolute value of ratio error is limited to be no greater than 25%. So, if the ratio error is 26%, it is rounded down to 25%. If the ratio error is 24% is left unchanged at 24%. The method then takes the resulting values and subtracts the resulting values from 25%. As an equation for the rating becomes:

$$\text{Rating}=25\%-(0\%<=|\text{actual ratio}-\text{ideal ratio}|<=25\%).$$

This subtraction is such that the 25% covers a gap of 25% of sample distribution. This process is repeated for each eye. The 25% value may be referred to as a predetermined value and may vary from embodiment to embodiment.

Figure 4:
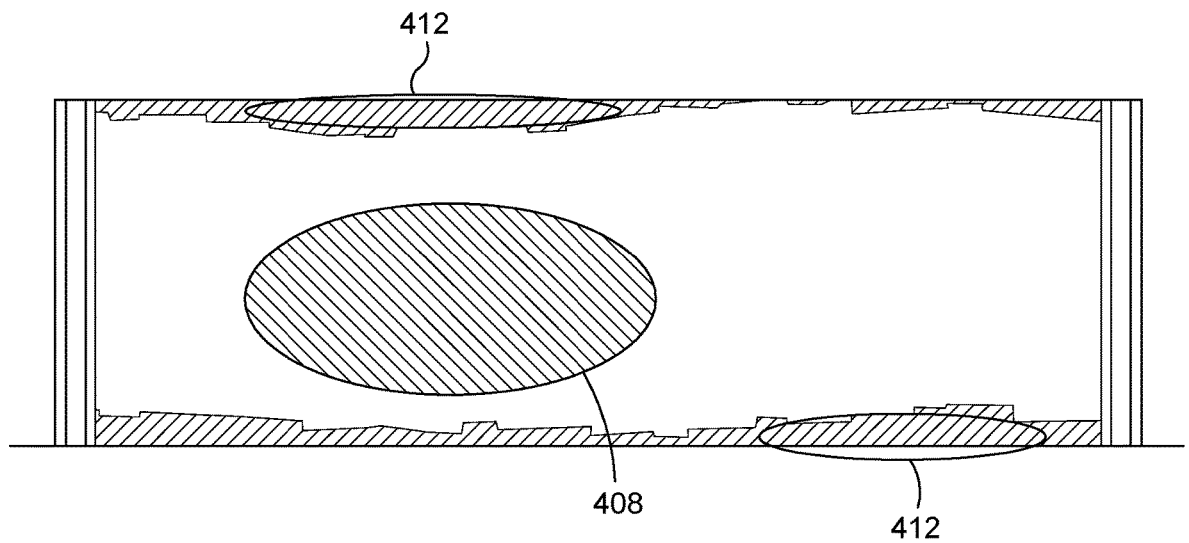
FIG. 4, which is described below in more detail, illustrates a hill of non-zero values surrounded by zero values.

Reviewing these processing steps at a higher level, this process focuses on one eye at a time and adapting one eye at a time. Then the process repeats for the next eye, then for the next eye. At a step 252, this process provides a more accurate center line by revealing if the horizontal line (value) at which the calculations occur, are close to the ideal eye or not. In the example case of the bottom eye (eye0), if the sample is inside that eye, the calculation will generate values very close to 25%. Further away from the eye, the answers will be closer to zero, and if outside eye, the answers will be 0. This results in what may conceptionally be described as a field of zeros with a hill of samples that show the location of the center of the eye. FIG. 4, which is described below in more detail, shows the hill of values 408 surrounded by zero values 412. The center of the eye has both a phase component and a voltage component.

Then, at a step 256, performing an analysis on all the samples in the hill of samples that are not zero (samples that form the hill of non-zero values in the field of zeros), a location of the samples with a predetermined value (for example 0.25 for a PAM4 system) are identified. The predetermined value may be defined as 1/N where N is the number of PAM-N levels. These samples are the samples that define the optimal threshold in relation to phase and voltage. When the processing locates the middle of that hill (the group of samples that have a 0.25 value), then the process has located the eye center.

Figure 3:
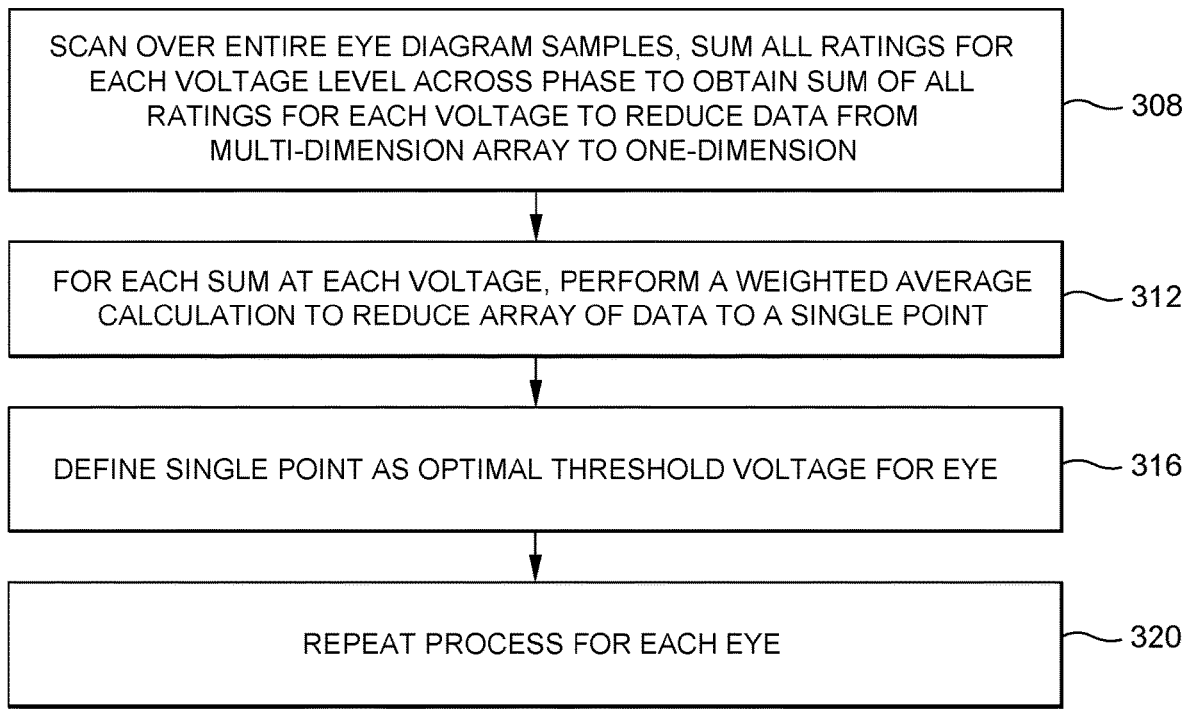
FIG. 3 illustrates a flow diagram of an exemplary method of operation for peak height calculation.

Turning to FIG. 3, in one embodiment, the eye center sample is determined using a rating equation to calculate a rating for every coordinate. Using reiterative loops, at a step 308, the system scans over the entire eye diagram to calculate the sum of all the ratings for each voltage, at numerous different phases, which occurs to obtain a sum that is a rating for that voltage. This causes the phase dimension to collapse, leaving only voltage. This process reduces multi-dimensional in two-dimensions to one-dimension.

At a step 312, the system has a rating sum versus voltage and then it performs a weighted average calculation on those sums (rating for each voltage). This process reduces the array of data from one dimension to a single point, which is the eye center voltage. In one configuration, the weighted average calculation is performed by the following: for each voltage, take the sum of ratings and multiply that by the voltage, then sum all of the resulting values, and this 'sum of all the resulting values' is defined as the weight. Hence, the weight is the sum of products (voltage×rating at that voltage).

Then, take all of the ratings and add them all up and this is called the 'sum of all ratings' If the ratings are taken for a particular phase and are summed up, then that is the voltage rating. However, if all the ratings are added up, then that is the sum of all ratings. The weighted average is calculated as weight divided by 'sum of all ratings'

Stated another way, when calculated, the first rating at each coordinate is the phase rating. A voltage rating is obtained if by summing all the phase ratings at a specific voltage, this is a voltage rating. If all the voltage ratings are summed, then that is considered the 'sum of all ratings' The weight then is the sum of all products of voltage rating times voltage.

As can be appreciated, there are two summing operations occurring. First the system calculates the rating at each coordinate as is described above. This is called the phase rating. Then, sum all the phase ratings for a specific voltage, and this is the voltage rating for each voltage. Then, summing all the voltage ratings will result in the sum of all ratings (i.e., sum of all voltage ratings). This is one of the numbers used to calculate the weighted average.

The weight is the sum of all 'voltage ratings times voltage'. Furthermore, the sum of all weightings is defined as the sum of all voltage weightings. The weighted average is the weight divided by the sum of all voltage ratings. At a step 316, the voltage that corresponds to the eye center, which is the information needed to set the threshold, is defined as the optimal threshold voltage for the eye. At a step 320, this process is repeated to obtain an eye center for each eye.

Returning to FIG. 2B this process uses the calibration as mentioned above. The calibration indicates where the eye should be. Thus, at a step 260, the process compares the eye's current location to where the eye should be, so it can be determined whether to move the slicer threshold up or down. At a step 264, if the eye is actually above an optimal location (as calculated), the system then increases the slicer threshold. In one embodiment, the slicer threshold control is a different subsystem of the control loop than that of the eye monitor sample voltage. In one embodiment, the eye monitor process outcome is used as an error signal to adapt the slicer threshold. If the eye is too low based on these eye monitor calculations, then the eye needs to move up, and the slicer threshold is reduced. The opposite occurs if the eye is too high. At a step 266, over time the actual eye location is adjusted during system operation to the calibrated location by these eye monitor calculations.

Step 228 through step 256 may be rephased as follows:
Define a 3-dimensional space (x=phase, y=sample voltage, z=rating)
Define the ideal ratio for each eye (0=bottom, 1=middle, 2=top) is defined as (3−eye)/4 for PAM4 (PAMN would be (N−1−eye)/N)
Measure the ratio at each x,y coordinate (# samples>=y)/ (total # samples)
Calculate the magnitude of z at each x,y (0.25−abs (measured ratio−ideal ratio)) bounded by the range 0 and 0.25 for PAM4 (PAMN would use 1/N)
(the 3D surface can be visualized to see each eye, but needs to be processed to compute an eye center result)
Collapse x axis by summing all ratings over phase (R=sum of z over range of x)
Collapse y axis by summing weighted R over voltage (W=sum of (y*R) over range of y)
Compute eye center by dividing the weight by the sum of all R (eye center=W/(sum of all R))

Figure 5:
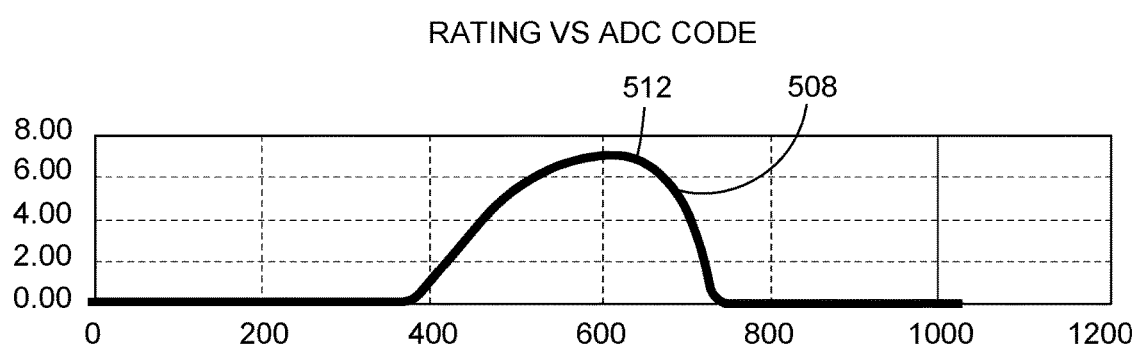
FIG. 5 is considered a side view of the plot of FIG. 4.

FIG. 4 and FIG. 5 are helpful in understanding the calculations described above. As shown in FIG. 4, the calculated values when plotted, form the hill 408 which is the center red area, while the area shown in green are the zero values 412 where the phase ratings are zero. As can be observed in FIG. 4, the hill 408 is not round, much as the eye itself is not round but by finding the middle of the eye the optimal slice point may be determined. FIG. 5 may be considered as side view of the plot of FIG. 4. As discussed before, the plot values that form the hill 408 have different values. The side view of the hill of FIG. 5 clearly illustrates that the values of the plot 508 vary within the hill area 408. The curve 508 in FIG. 5 is a plot of voltage rating versus voltage. The ideal eye location is not necessarily the peak point 512 in the plot since the peak point may not be in the center of the plot. As shown, it may be off to one side where the plot 508 has a peak 512.

Figure 6:
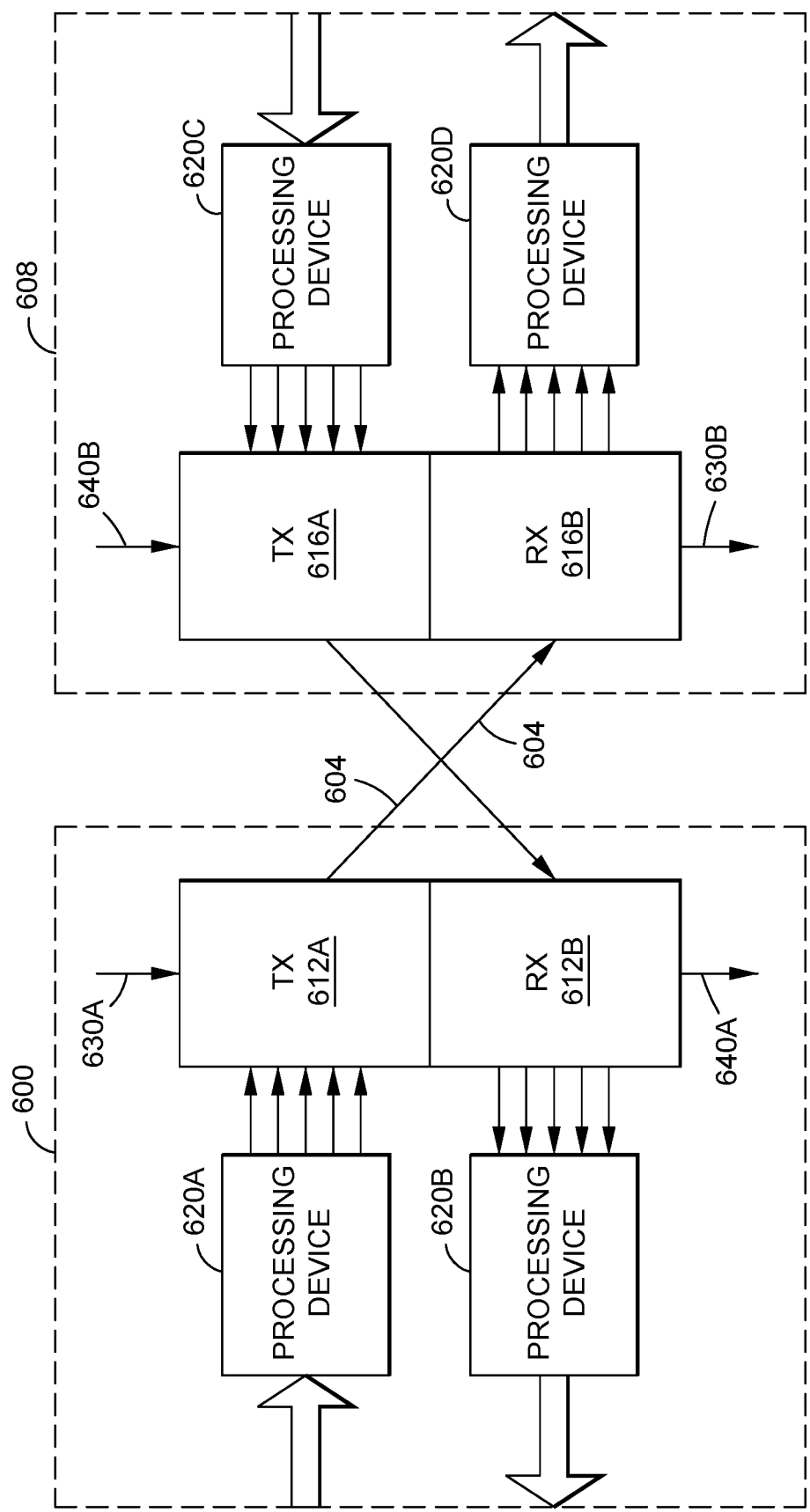
FIG. 6 illustrates a block diagram of an example embodiment of a multi-station communication system.

The system used to enable this method may be an eye monitor and a communication system which may include, in one example embodiment, one or more of the following: an equalizer, a clock and data recovery module, a sampling unit, such as an analog to digital converter, a phase interpolator, a phase detector, a controller, a slicer, an ASIC, a processor, memory or any other element or combination of elements configured to perform as described herein. FIG. 6 illustrates a block diagram of an example embodiment of a multi-station communication system configured in accordance with the method and apparatus disclosed herein. As shown, a first station 600 is configured to communicate over one or more channels 604 with a second station 608. Each of the first station 600 and the second station 608 may comprise a receiver 612B, 616B and a transmitter 612A, 616A. At least one of the receivers 612B, 616B and transmitters 612A, 616A connect to a processing device 620A, 620B, 620C, 620D as shown. The processing devices 620 may comprise one or more of a processor, ASIC, control logic, state machine, switch fabric, modulator, demodulator, or any other such device. The processing device 620 may be configured to perform signal equalization, filtering, quantization (slicing) or any other type of signal processing or signal analysis as discussed herein, such as the calculations for the quantizer settings. Input to the processing devices 620 may occur in any manner known in the art. Similarly, although certain paths or interfaces are shown as either serial or parallel, it is fully contemplated that any of these paths may be configured as either serial or parallel paths or both.

Optional inputs 630A, 640B to the transmitters 612A, 616A, comprise inputs that are provided for system data so that system data may be processed within or by the transmitters. This may allow the system data to be transmitted over the channel(s) 604 with the network data. Similarly, the receivers 612B, 616B output signals 640A, 630B which provide system data that was recovered or separated from the signal transmitted over channel 604.

Figure 7A:
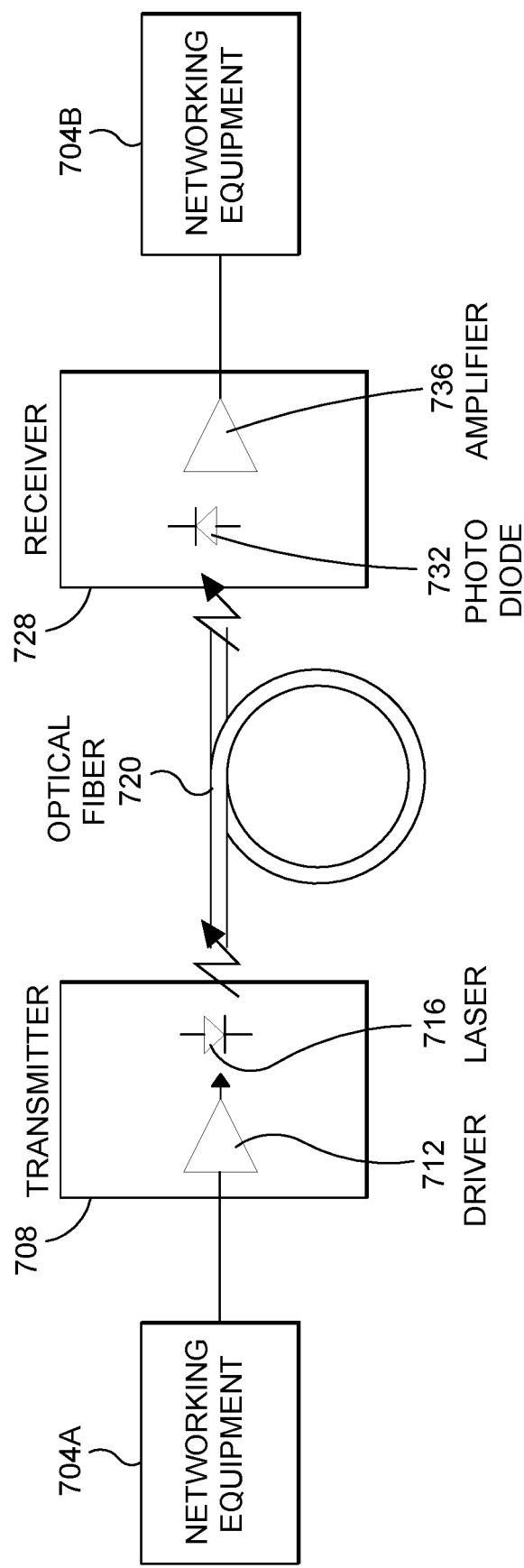
FIG. 7A illustrates an exemplary optic fiber communication link.

One example environment of use is in an optic communication system that utilizes optical fiber links and lasers or some other form of optic signal generator (light source). FIG. 7A illustrates an exemplary optic fiber communication link. To enable communication between remote networking equipment 704A, 704B a fiber optic transmitter and receiver is provided. Laser drivers 712, part of a transmitter 708, drive the lasers 716 with a modulating current which produces modulating optical output from lasers. This optical output is coupled into the optical fiber 720 for signal transmission. At the receive side of the optical fiber link is a receiver 728. Optical energy is converted into electrical signals by a photodiode 732 and processed further by an amplifier 736 to set the signal magnitude to a level suitable for further processing. Furthermore, although shown as a single path from network equipment 704A to networking equipment 704B, it is contemplated that data flow on the communication path may be bi-directional or that a separate return path may be provided from network equipment 704B to networking equipment 704A. It is contemplated that the innovation disclosed herein may be used in other environments.

Figure 7B:
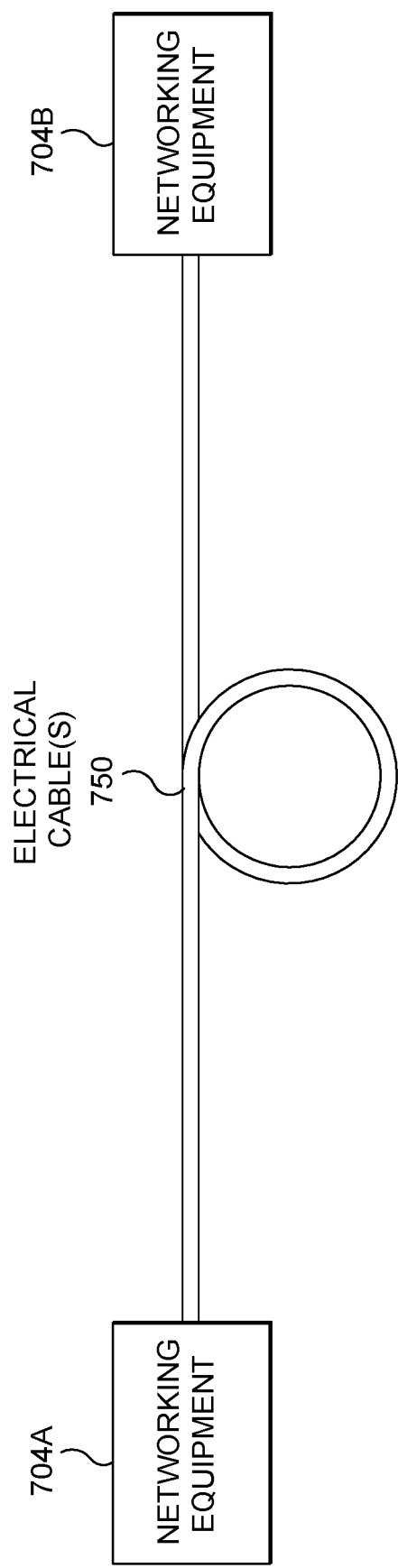
FIG. 7B illustrates an exemplary wire line communication link.

FIG. 7B illustrates an exemplary wireline communication link. As compared to FIG. 7A, identical elements are labeled with identical reference numbers. Instead of an optical communication path and optical transmitters as shown in FIG. 7A, shown is a wireline system having electrical cable(s) 750 which connect to the networking equipment 704A, 704B. Communication devices which utilized a conductive channel are known and not described herein. It is also contemplated that the innovations disclosed herein may be used in a wireless system, or any system that would benefit from the improved eye center calculation as disclosed herein.

FIG. 8 is a block diagram of an exemplary environment of use. This is but one possible system where the method disclosed herein may be used. An input 804 provides an input signal from a channel (optic, wireline, wireless) to an optional equalizer for equalization to mitigate the distorting effects of the channel. The equalizer 808 performs frequency specific manipulation of the signal and provides an equalized signal to a quantizer 812 and a controller 816. The quantizer 812 may be a slicer or any device configured to compare and quantize an input signal to two or more logic levels or predetermined values based on a comparison of the input signal to one or more threshold values. The threshold values and calculations to determine optimal threshold values are discussed above. The quantizer 812, such a slicer, is known by those of ordinary skill in the art and as such is not described in detail. The output of the quantizer 812 is presented on an output 820 for subsequent processing and to the controller 816.

The controller 816 may be any combination of hardware, software, or both configured to processes signal and/or the equalizer output and based on the analysis, execute the method steps discussed herein to identify the optimal eye centers that provide the optimal slice level/point determination. The controller 816 performs the processing described above to analyze the numerous sample points which form the eye diagram and to calculate the optimal threshold levels, which can then be used to modify the default or prior calibrated threshold levels. Feedback and comparisons from the input signal on input 804 and the output signal on output 820 may also be considered by the controller 816. The controller 816 provides the updated or corrected threshold values for each slice point to the quantizer 812.

The controller 816 may include an eye monitor capable of detecting and monitoring one or more aspects of an eye in an eye diagram plot, and processing data samples that form the eye diagram. In one embodiment, the controller 816 is configured as a finite state machine with a limited instruction set and thus capable of executing machine executable instructions that may be stored in a memory in a non-tangible format. The controller 816 may comprise a processor configured to execute machine readable code. To enable high speed operation many functions are enabled in hardware, such as a state machine, or at partially in hardware and partially in software executed on a processor. For example, a purely hardware configuration may be used, or a DSP, ASIC, processor executing software code, statement or any other element configured to perform as described herein. In other embodiment, the controller 816 may be a processor executing non-transitory machine readable code.

Other systems, methods, features and advantages of the invention will be or will become apparent to one with skill in the art upon examination of the following figures and detailed description. It is intended that all such additional systems, methods, features, and advantages be included within this description, be within the scope of the invention, and be protected by the accompanying claims.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

Other systems, methods, features and advantages of the invention will be or will become apparent to one with skill in the art upon examination of the following figures and detailed description. It is intended that all such additional systems, methods, features, and advantages be included within this description, be within the scope of the invention, and be protected by the accompanying claims.

What is claimed is:

1. A method for locating eye center in a signal plot, based on received samples in a communication system, for optimized quantizer threshold determination comprising:
   determining a location of a selected eye of an eye diagram plot and for the selected eye;
   for a different voltage levels, count a number of samples which are above or below the voltage level to determine a sample counts at different voltage levels;
   process sample counts to determine middle of eye;
   for two or more different voltage levels and at difference phases, calculate an actual ratio of samples above a particular voltage level in relation to total number of samples;
   associate the actual ratios with each sample at which ratio was calculated;

for one or more samples, subtract ideal ratio from actual ratio to calculate ratio error;

for one or more samples, calculate absolute value of ratio error;

for one or more absolute value of ratio error, round down absolute value of the ratio error values that are over a predetermined value to create ratings;

analyze ratings to locate eye center voltage such that rounded ratings at or near the predetermined values are defined as being in the eye;

for ratings which are in the eye, define the rating in the center of the group of ratings which are in the eye, and define the rating in the center as the optimal voltage and phase for an eye.

2. The method of claim 1 wherein the ideal ratio is a ratio based on the number of expected sample value above a voltage level in relation to the total number of samples.

3. The method of claim 1 wherein the predetermined value is 1/N, where N is the number of PAM-N levels.

4. The method of claim 1 wherein the method is repeated for each eye.

5. The method of claim 1 wherein a sample is defined by a voltage magnitude at a phase.

6. The method of claim 1 further comprising adjusting a quantizer threshold based on the optimal voltage and phase for an eye.

7. The method of claim 1 wherein locating rating in the center of the group further comprises:

summing the ratings for multiple voltage levels to obtain a sum of all rating for each voltage to create rating sums; and for the rating sums, perform a weighted average calculation to reduces rating sums to a single point such that the single point is the optimal threshold voltage.

8. A system for determining an optimal threshold value for use in a quantizer that is part of a communication system comprising:

a receiver, that is part of the communication system, the receiver comprising:

a quantizer configured process a received signal to assign a value to a signal at a slice point by comparing the signal to one or more threshold values;

a controller configured to process a received signal to determine optimal threshold values or calculate an offset to an existing threshold values, the processing performed by the controller for an eye of an eye diagram plot of signal value comprising:

for two or more different voltage levels and at difference phases, calculate an actual ratio defined as a number of samples above a voltage level in relation to total number of samples;

associate the actual ratios with each sample at which actual ratio was calculated;

for one or more samples, subtract an ideal ratio from the actual ratio to calculate ratio error;

calculate absolute value of ratio error;

round down the absolute value of the ratio error values that are over a predetermined value to create ratings over a predetermined value;

analyze ratings over a predetermine value identify a rating in the center of the ratings over a predetermined value and designate that rating as the optimal voltage and phase for an eye.

9. The system of claim 8 wherein the controller comprises a finite state machine configured to execute machine executable instructions.

10. The system of claim 8 wherein the ideal ratio is a ratio based on the number of expected sample value above a voltage level in relation to the total number of samples.

11. The system of claim 8 wherein the predetermined value is 1/N, where N is the number of PAM-N levels.

12. The system of claim 8 where a sample is defined by a voltage magnitude at a phase.

13. The system of claim 8 wherein the center of the ratings is computed by:

summing the ratings for multiple voltage levels to obtain a sum of all rating for each voltage to create rating sums; and for the rating sums, perform a weighted average calculation to reduces rating sums to a single point such that the single point is the optimal threshold voltage.

14. A method for locating eye center in a signal plot, based on numerous received samples in a communication system receiver, for optimizing quantizer threshold levels comprising:

for two or more different voltage levels within an eye, count a number of samples which are above or below the two or more voltage levels to determine a sample counts at the two or more different voltage levels;

for two or more different voltage levels, which are within the eye, and at difference phases, which are within the eye, calculate an actual ratio of samples above or below the two or more different voltage levels in relation to total number of samples;

associate the actual ratios with the sample at which the actual ratio was calculated;

for one or more samples, subtract an ideal ratio from actual ratio to calculate ratio error;

for one or more samples, calculate absolute value of ratio error;

for one or more absolute value of ratio error, round down absolute value of the ratio error values that are over a predetermined value to create ratings;

analyze the ratings to locate eye center voltages such that rounded data at or near the predetermined value are in the eye;

for ratings which are non-zero, define the rating which is at the center of the non-zero ratings as being the optimal voltage and phase for the eye.

15. The method of claim 14 wherein the ideal ratio is a ratio based on the number of expected sample value above a voltage level in relation to the total number of samples.

16. The method of claim 14 wherein the rating is a single value for each sample.

17. The method of claim 14 further comprising adjusting a quantizer threshold based on the optimal voltage and phase for the eye.

18. The method of claim 14 wherein the predetermined value is 1/N, where N is the number of PAM-N levels.

19. The method of claim 14 wherein the center of the non-zero ratings is located by:

summing the ratings for multiple voltage levels to obtain a sum of all rating for the multiple voltages to create rating sums; and performing a weighted average calculation on the rating sums to reduce rating sums to a single point such that the single point is the optimal threshold voltage.

* * * * *